Dec. 12, 1933.  E. W. SMITH  1,938,982
METHOD OF MAKING GLASS WOOL SEPARATORS
Filed Oct. 14, 1932
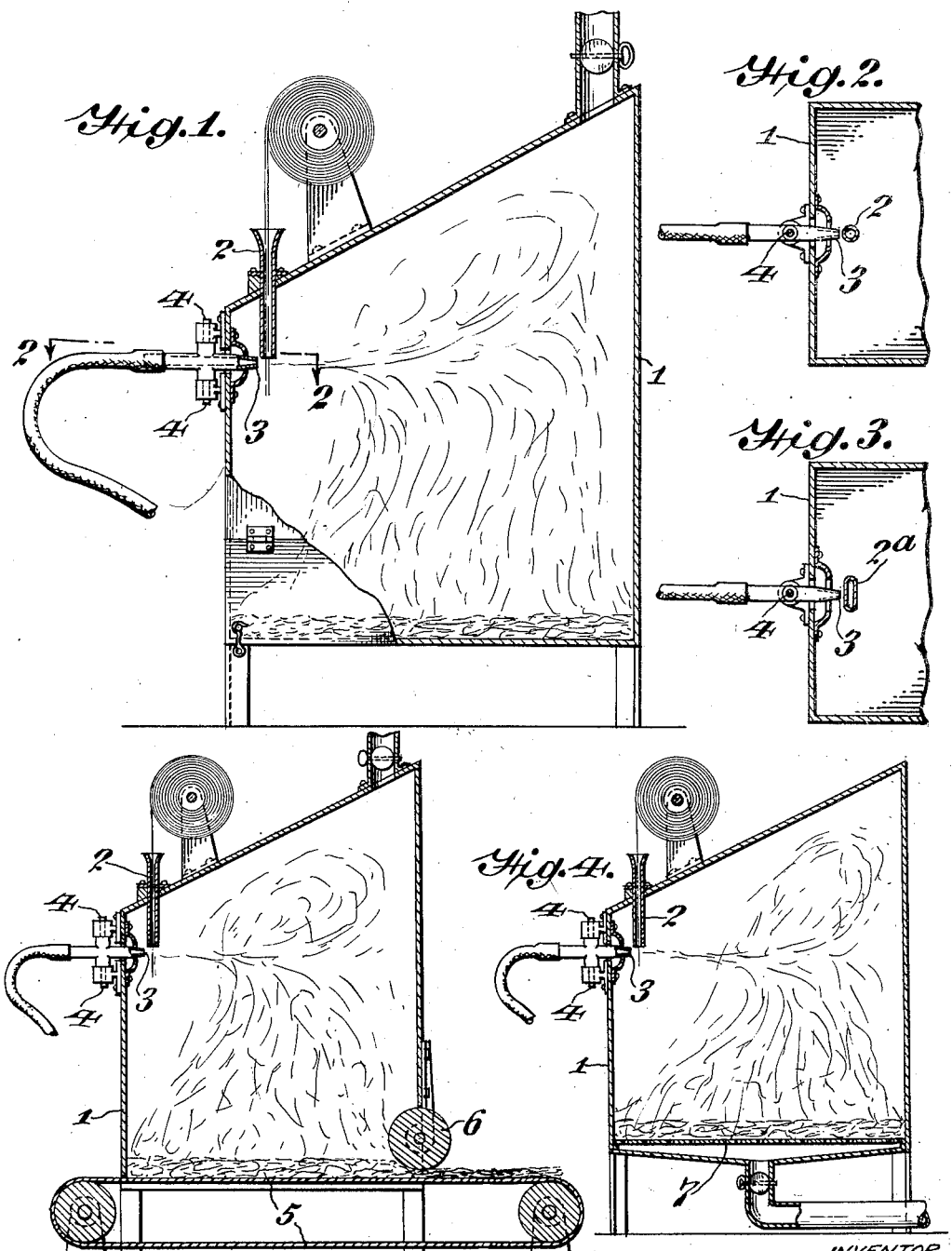
INVENTOR
Edward Wanton Smith,
BY
Augustus B. Stoughton
Attorney

UNITED STATES PATENT OFFICE 1,938,982

METHOD OF MAKING GLASS WOOL SEPARATORS

Edward Wanton Smith, Philadelphia, Pa.

Application October 14, 1932. Serial No. 637,773

3 Claims. (Cl. 154—2)

The present invention has for its object an improved method for the manufacture of felted mats or sheets of glass fibres (glass wool) especially adapted for use as separators or retainers in storage batteries.

Glass wool sheets of this kind have been employed in the past, and one of the most successful methods of manufacture has been to deposit successive very thin layers of the glass fibres upon a revolving drum, until the necessary thickness has been attained, and then removing the mat or sheet from the drum by cutting it in the direction of the axis of the drum.

As distinguished from that method, the process of the present invention consists in dispersing glass fibres of suitable lengths by means of a blast of air; then allowing the detached pieces of fibre to settle or gravitate, and finally deposit in a completely heterogeneous, interlaced mass. When a sufficient quantity of mat or felt has settled out, it may be compacted to correct thickness, and thereupon may be lightly cemented together for handling purposes, by applying a suitable binder, such as a solution of gum arabic or by the application of heat for light fusion.

In the accompanying drawing forming part hereof,

Figure 1 illustrates, principally in central vertical section, an apparatus suitable for carrying out the process of the invention.

Fig. 2 is a horizontal cross section taken on the line 2—2 of Fig. 1.

Fig. 3 is a view similar to Fig. 2 illustrating a modification.

Fig. 4 is a view similar to Fig. 1 illustrating another modification, and

Fig. 5 is a view similar to Fig. 4 illustrating another modification.

The apparatus shown in Fig. 1 consists of a closed compartment, chamber or box 1 whose base is of such size as to give a suitable sheet for cutting up into the separators. 2 is a tube through which an untwisted strand or skein of glass fibres may be fed into the box. 3 is a compressed air nozzle, mounted on pivots 4 so as to sweep past the lower end of tube 1 from side to side.

In the practice of the invention by means of the apparatus shown in Fig. 1, a skein of glass wool is inserted in tube 2 and pushed downward until the fibres project the required distance, say of the general order of a few inches up to eight or ten inches, more or less. Then the jet of compressed air is swept slowly across the mouth of tube 2 with the result that it breaks off the fibres more or less individually, and scatters them in a diffused mass throughout the space in the box 1. After the air jet has swept across and cut off the entire skein of fibres, the latter is again fed downward, the air jet again swept across, and this process is repeated until there has been deposited a sufficient mat of fibres on the bottom of the box. It is to be noted that inasmuch as the fibres are being practically continuously broken off and scattered through the air, they are settling down on the floor in a steady slow motion not unlike that of descending snow, so that the resulting mat constitutes a continuous heterogeneous, interlaced, feltlike mass. The application of heat to the incoming fibres reduces the effect of any static electricity with which they may be charged.

As the fibres are deposited very loosely, the mat requires subsequent compacting, which may be done either by a light pressing, or a rolling operation, after removal from the box.

As a modified apparatus for the practice of the invention, the bottom of the box, Fig. 5, may consist of a continuously moving conveyor belt 5, at the outgoing side of which a roll 6 (or a series of rolls, progressively closer to the conveyor) furnishes the necessary compacting action.

Mechanical means for cutting off the fibres, while the air jet is applied, may be used if desired, but experience indicates that the air jet performs this function quite satisfactorily.

It will be obvious that sundry variations may be made in detail, without departing from the principle of this invention. For instance, it may be advantageous to start with glass fibres in other than skein form, and to separate them by a carding operation or the like, at which point the air jet or blast picks up the individual fibres and floats them as described. In Fig. 3 is shown a tube 2ª of oblong section. Also I might, in connection with Fig. 4, mention that the settling box may be provided with a porous floor 7, from the under side of which the air is exhausted, thus helping by suction to compact the deposited layer of fibres.

It will be obvious to those skilled in the art that modifications may be made in details of procedure and in matters of mere form without departing from the spirit of the invention which is not limited to such matters or otherwise than the prior art and the appended claims may require.

I claim:

1. The process of forming a glass wool mat which comprises cutting glass fibres of suitable lengths from a skein, and at the same time impinging a fluid jet upon them, which disperses them, and settling them in heterogeneous arrangement.

2. The process of forming a glass wool mat which comprises impinging upon a skein of glass fibres a jet of compressed air, which breaks off the fibres and disperses them through the air, whence they settle in intermeshed heterogeneous arrangement.

3. The process of making a glass wool mat which comprises carding a mass of glass wool and simultaneously applying a blast of air to remove and disperse the fibres as they are separated, and settling such fibres on a floor beneath, in heterogeneous, interlaced arrangement.

EDWARD WANTON SMITH.